United States Patent
Ahmad et al.

(10) Patent No.: US 9,471,768 B2
(45) Date of Patent: Oct. 18, 2016

(54) CONTINUOUSLY CHANGING UNLOCK PATTERN USING MOVING ICONS

(71) Applicant: International Business Machines Corporation, Armonk, NY (US)

(72) Inventors: Faraz Ahmad, Noida (IN); Adekunle Bello, Pflugerville, TX (US); Gregory J. Boss, Saginaw, MI (US); Anto A. John, Trichy (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/594,416

(22) Filed: Jan. 12, 2015

(65) Prior Publication Data

US 2016/0203308 A1    Jul. 14, 2016

(51) Int. Cl.
 *G06F 7/04* (2006.01)
 *G06F 12/14* (2006.01)
 *G06F 21/36* (2013.01)
 *G06F 3/0481* (2013.01)
 *G06F 3/0482* (2013.01)
 *G06F 3/0488* (2013.01)

(52) U.S. Cl.
 CPC ............ *G06F 21/36* (2013.01); *G06F 3/0482* (2013.01); *G06F 3/0488* (2013.01); *G06F 3/04817* (2013.01)

(58) Field of Classification Search
 CPC .... G06F 21/31; G06F 3/04817; G06F 21/36; G06F 3/0482; G06F 3/0488
 USPC .......................................................... 726/19
 See application file for complete search history.

(56) References Cited

U.S. PATENT DOCUMENTS

| 7,231,231 | B2 | 6/2007 | Kokko et al. | |
|---|---|---|---|---|
| 2009/0006991 | A1 | 1/2009 | Lindberg et al. | |
| 2010/0070926 | A1* | 3/2010 | Abanami | G06F 1/1626 715/835 |
| 2013/0333020 | A1 | 12/2013 | Deshpande et al. | |
| 2014/0137049 | A1 | 5/2014 | Jung et al. | |
| 2014/0365904 | A1* | 12/2014 | Kim | G06F 3/0484 715/741 |

FOREIGN PATENT DOCUMENTS

| CN | 101604223 | 12/2009 |
|---|---|---|
| CN | 101699835 | 4/2010 |

(Continued)

OTHER PUBLICATIONS

Ahmad et al., "Continuously Changing Unlock Pattern Using Moving Icons," U.S. Appl. No. 14/824,411, filed Aug. 12, 2015, 31 pages.

(Continued)

*Primary Examiner* — Kambiz Zand
*Assistant Examiner* — Aubrey Wyszynski
(74) *Attorney, Agent, or Firm* — VanLeeuwen & VanLeeuwen; Scott S. Dobson

(57) ABSTRACT

An approach is provided for displaying moving graphic objects on the display screen of the information handling system that are selected by a user while the objects are moving. The system is unlocked in response to the set of graphic objects selected by the user and the selection order matching an expected set of graphic objects and an expected selection order. Unlocking of the system allows the user to interact with one or more applications of the information handling system and to access data stored on the information handling system.

13 Claims, 8 Drawing Sheets

(56) References Cited

FOREIGN PATENT DOCUMENTS

| | | |
|---|---|---|
| CN | 102043587 | 5/2011 |
| EP | 1953663 | 8/2008 |
| EP | 2079011 | 7/2009 |
| EP | 2357776 | 8/2011 |
| WO | 2014019118 | 2/2014 |

OTHER PUBLICATIONS

"List of IBM Patents or Patent Applications Treated as Related," Letter from Leslie A. Van Leeuwen, Aug. 12, 2015, 1 page.

Anonymous, "An intelligent algorithm to determine and change icon sizes and layout dynamically on touch devices," ip.com, IPCOM000218924D, Jun. 12, 2012, 8 pages.

* cited by examiner

US 9,471,768 B2

CONTINUOUSLY CHANGING UNLOCK PATTERN USING MOVING ICONS

BACKGROUND OF THE INVENTION

1. Technical Field

This disclosure relates to securing a device using a continuously changing unlock pattern of moving graphical objects selected by the user to unlock the device.

2. Description of Related Art

Security breaches are a major cause of lost revenue and loss of trust for companies and other organizations. When an organization's sensitive private data is hacked, the breach is often is widely publicized and may result in incalculable damage to the organization's reputation, trust level, and revenue. Many security breaches stem from individual accounts that have been hacked as a result of "shoulder attacks." A shoulder attack is an attack where an observer (hacker) positions himself over the target's shoulder in order to observe the password or pattern being entered on the device (phone/tablet/computer). This is sometimes a social engineering form of attack where the hacker has direct or indirect contact with the victim.

SUMMARY

An approach is provided for displaying moving graphic objects on the display screen of the information handling system that are selected by a user while the objects are moving. The system is unlocked in response to the set of graphic objects selected by the user and the selection order matching an expected set of graphic objects and an expected selection order. Unlocking of the system allows the user to interact with one or more applications of the information handling system and to access data stored on the information handling system.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
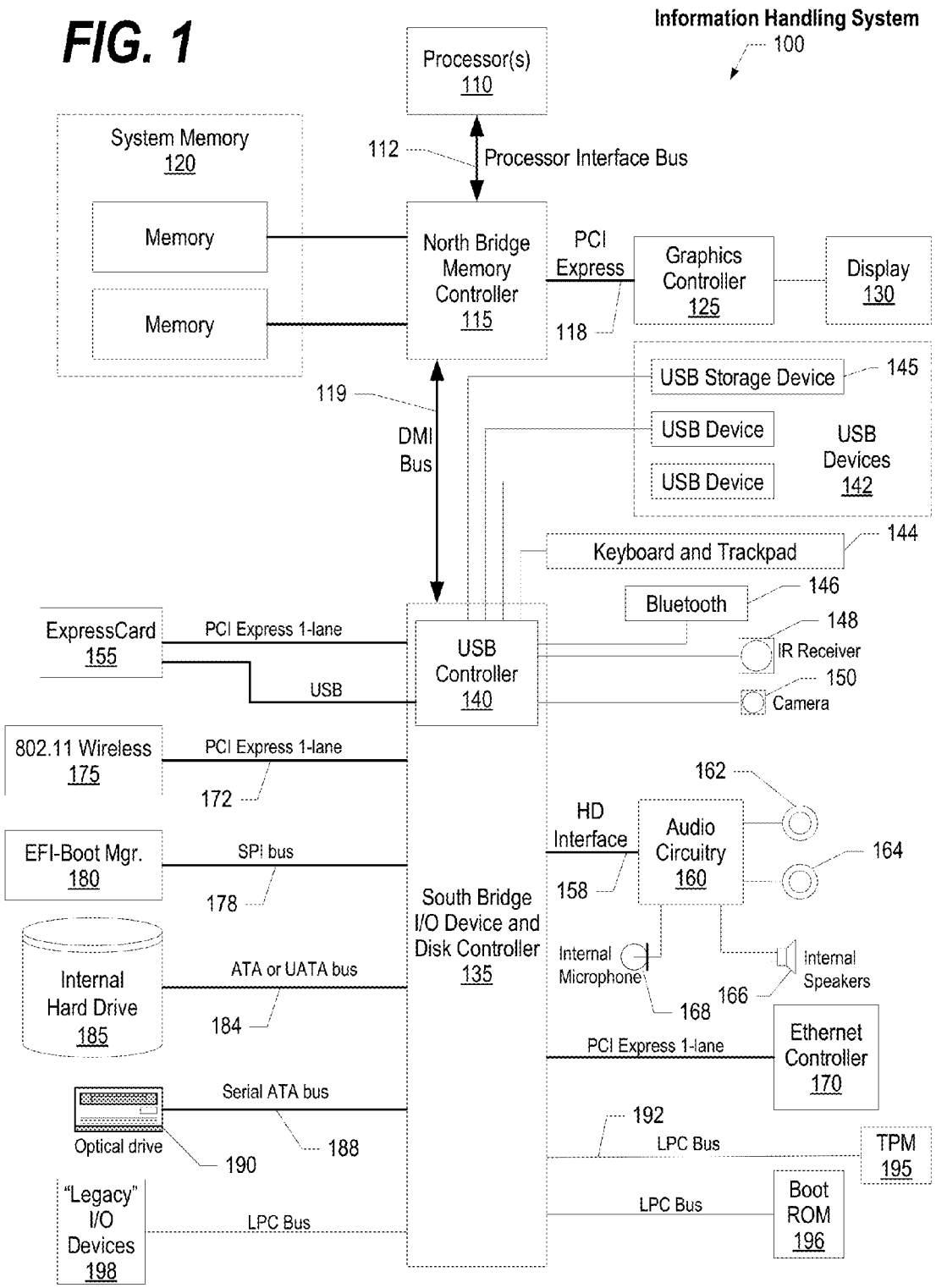
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
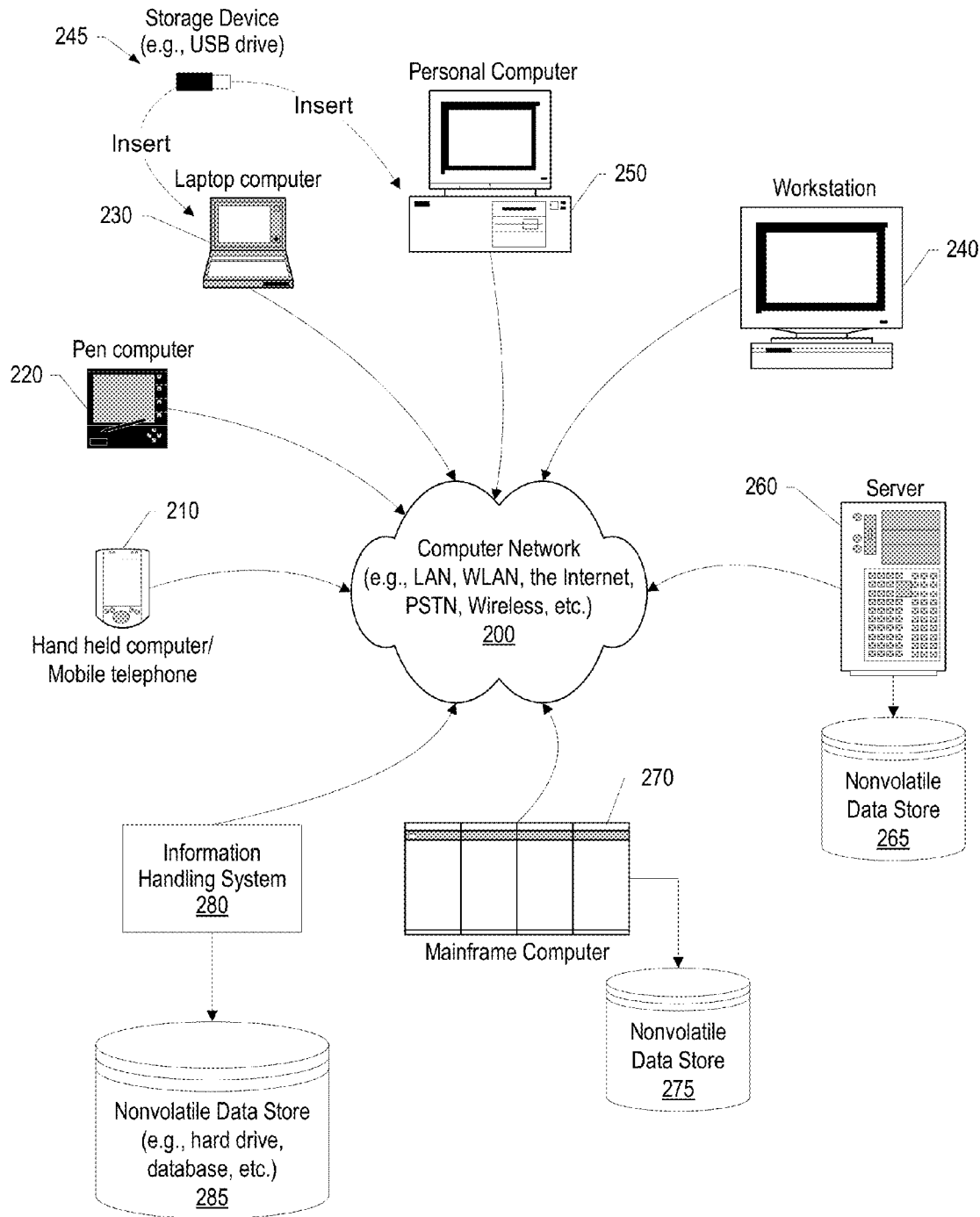
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 show an approach for securing an information handling system. This system begins with an unlock screen on which randomly moving graphical objects are displayed. The objects have sufficient variety as to be distinguishable from each other, but objects may also be repeated. The objects may consist of different attributes (size, shape, color, speed of movement, etc). The unlock code, or pattern, is an ordered list of these objects. During configuration, the user selects the order in which the objects are connected in order to unlock the device. Since the objects are in constant and random motion, the unlock pattern as seen by an observer will not be repeated. The movement of icons on the screen makes shoulder attacks extremely difficult for hackers to execute because the hacker would have to memorize the objects touched by the user, rather than observing the object after the finger has left it.

By way of an example, a user named Tom has picked the following unlock pattern (red triangle, blue dot, yellow exclamation point, red mushroom). Tom turns on his tablet and is unaware that a social engineering hacker is looking over his shoulder in an attempt to learn his password. Tom's 10 inch device is showing ¾ of the screen as the pattern unlock area and there are 22 objects randomly floating around the screen. Tom puts his finger on the red triangle and begins dragging his finger to the moving blue dot. Once Tom's finger passes over the blue dot, Tom's finger continues on to pass over the yellow exclamation point. Tom's finger then circles back to touch the red mushroom and then lifts his finger off the screen at which time the red mushroom has already changed to a slightly smaller red mushroom. Tom's device unlocks and the hacker has no idea what the password was because it was far to complicated to observe the 22 objects moving in a seemingly random pattern. In one embodiment, the graphic objects, once selected, change to different graphic objects (e.g., a green mushroom, once selected, changes to a red tomato, etc.). This adds further difficulty to a hacker learning the correct sequence of graphic objects selected to unlock the device.

Figure 3:
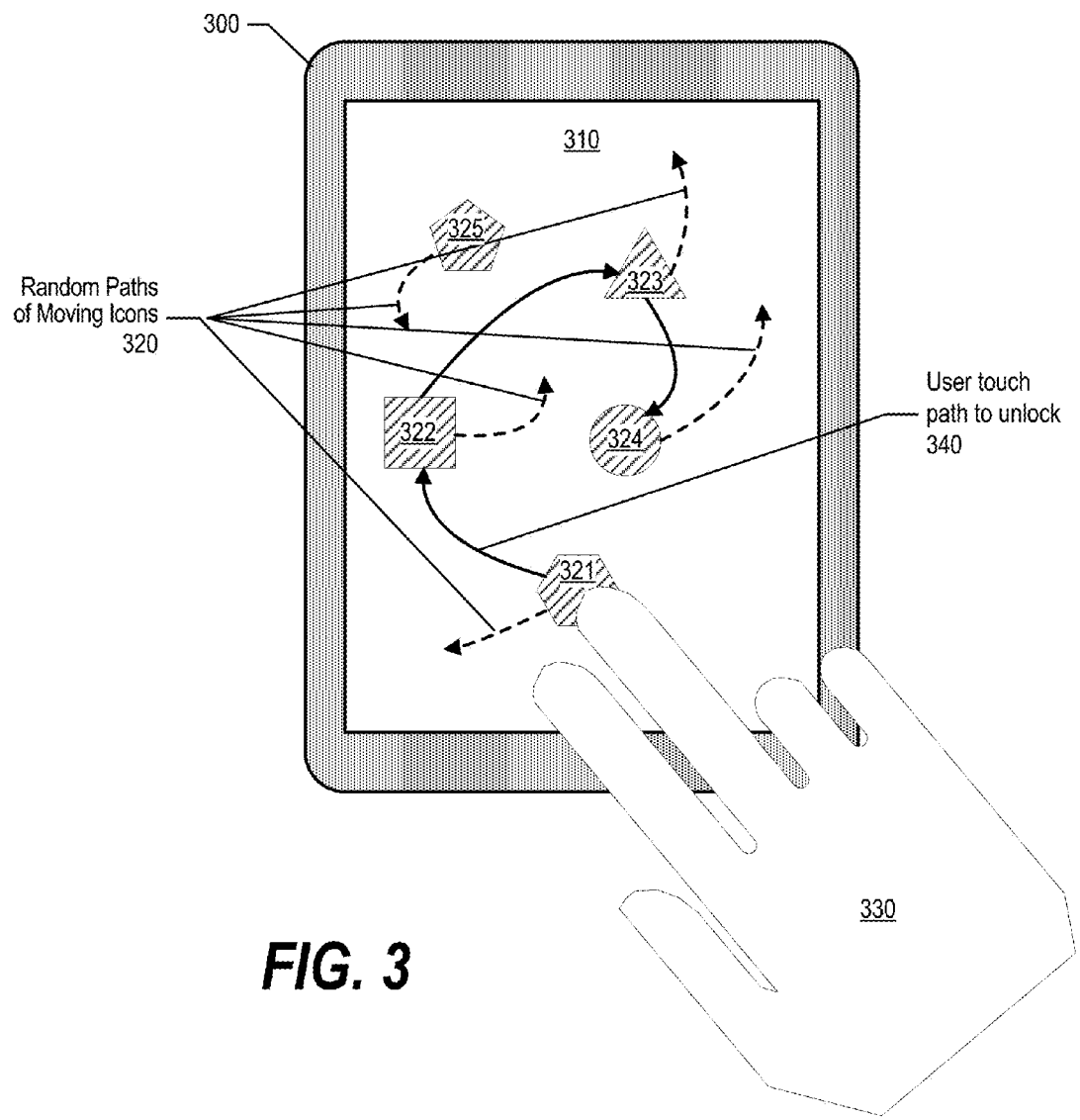
FIG. 3 is a diagram depicting a user unlocking a device protected with a changing unlock pattern of moving icons.

FIG. 3 is a diagram depicting a user unlocking a device protected with a changing unlock pattern of moving icons. Information handling system 300, such as a smart phone, tablet computer, laptop computer, etc., includes screen 310 upon which moving graphic objects 321, 322, 323, 324, and 325 are displayed. As shown, the graphic objects move in a pseudo-random path irrespective of the other objects (random paths 320). In one embodiment, the graphic objects are aware of the other graphic objects to avoid visual collisions.

User 330 uses an input device, such as a finger, stylus, or other pointing device, to touch graphic objects in a correct order. The moving graphic objects (321-325) are displayed on display screen 310 of information handling system 300. The system receives, from user 330, a selection of a set of the moving graphic objects in a selected order as shown by user touch path 340. The information handling system is unlocked in response to the set of graphic objects selected by the user and the selection order matching an expected set of graphic objects and an expected selection order. The unlocking of the information handling system allows the user to interact with applications stored on the information handling system and allows the user to access data stored in a memory of the information handling system.

Figure 4:
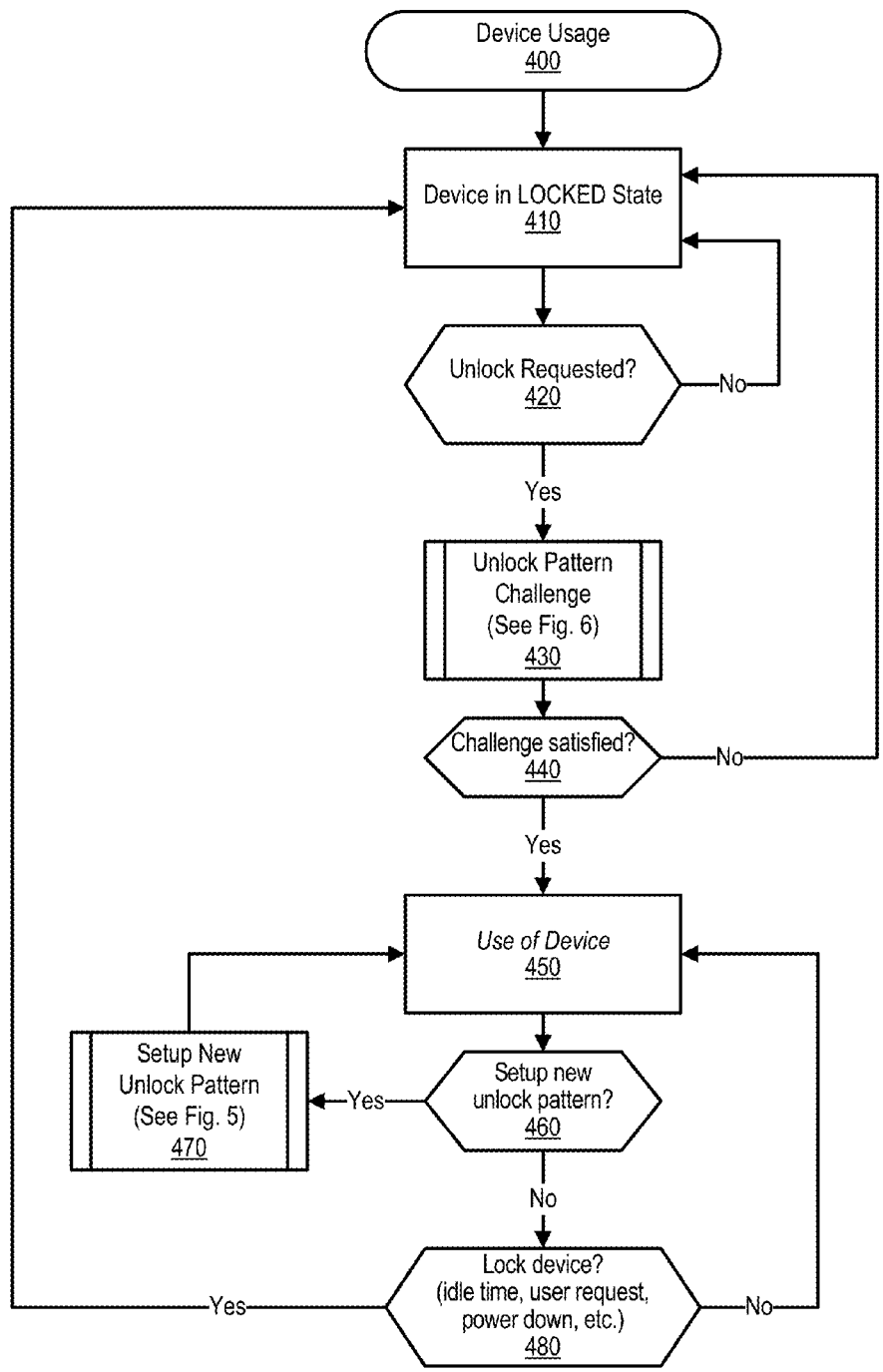
FIG. 4 is a flowchart showing high-level steps taken to secure a device with a changing unlock pattern of moving icons.

FIG. 4 is a flowchart showing high-level steps taken to secure a device with a changing unlock pattern of moving icons. Processing commences at 400 whereupon, at step 410, the information handling system is shown being in a locked state where the user is unable to interact with applications and data stored on the information handling system. A decision is made by the process as to whether a user of the information handling system has requested to unlock the device (decision 420). Decision 420 continues to branch to the 'no' branch and remain in a locked state until an unlock request is received. When an unlock request is received, decision 420 branches to the 'yes' branch to process the request.

At predefined process 430, the system performs the unlock pattern challenge which presents the user with a set of moving graphic objects and the user selects the graphic objects in a correct order to unlock the device (see FIG. 6 and corresponding text for processing details)). A decision is made by the process as to whether the user successfully completed the unlock pattern challenge (decision 440). If the challenge was not satisfied, then decision 440 branches to the 'no' branch which loops back to step 410 with the device remaining in the locked state. On the other hand, if the user successfully completed the challenge, then decision 440 branches to the 'yes' branch for further processing.

At step 450, the information handling system is unlocked and the user is allowed to interact with applications stored on the system and is also allowed to access data stored on the information handling system. A decision is made by the process as to whether the user has requested to setup a new unlock pattern for the device (decision 460). If the user requests setup of a new unlock pattern, then decision 460 branches to the 'yes' branch whereupon, at predefined process 470, the system performs the setup new unlock pattern process (see FIG. 5 and corresponding text for processing details), and processing loops back to step 450 to allow the user to continue using the unlocked device.

If the user is not requesting to setup a new unlock pattern for the information handling system, then decision 460 branches to the 'no' branch at which point a decision is made by the process as to whether to lock the device (decision 480). The decision to lock the device can be made based on an amount of idle time, a user request to lock the device, a power down of the device, etc. If the device is not being locked, then decision 480 branches to the 'no' branch which loops back to step 450 with the user continuing to be able to utilize the device. However, if the device is being locked, then decision 480 branches to the 'yes' branch which loops back to step 410 with the device being returned to a locked state.

Figure 5:
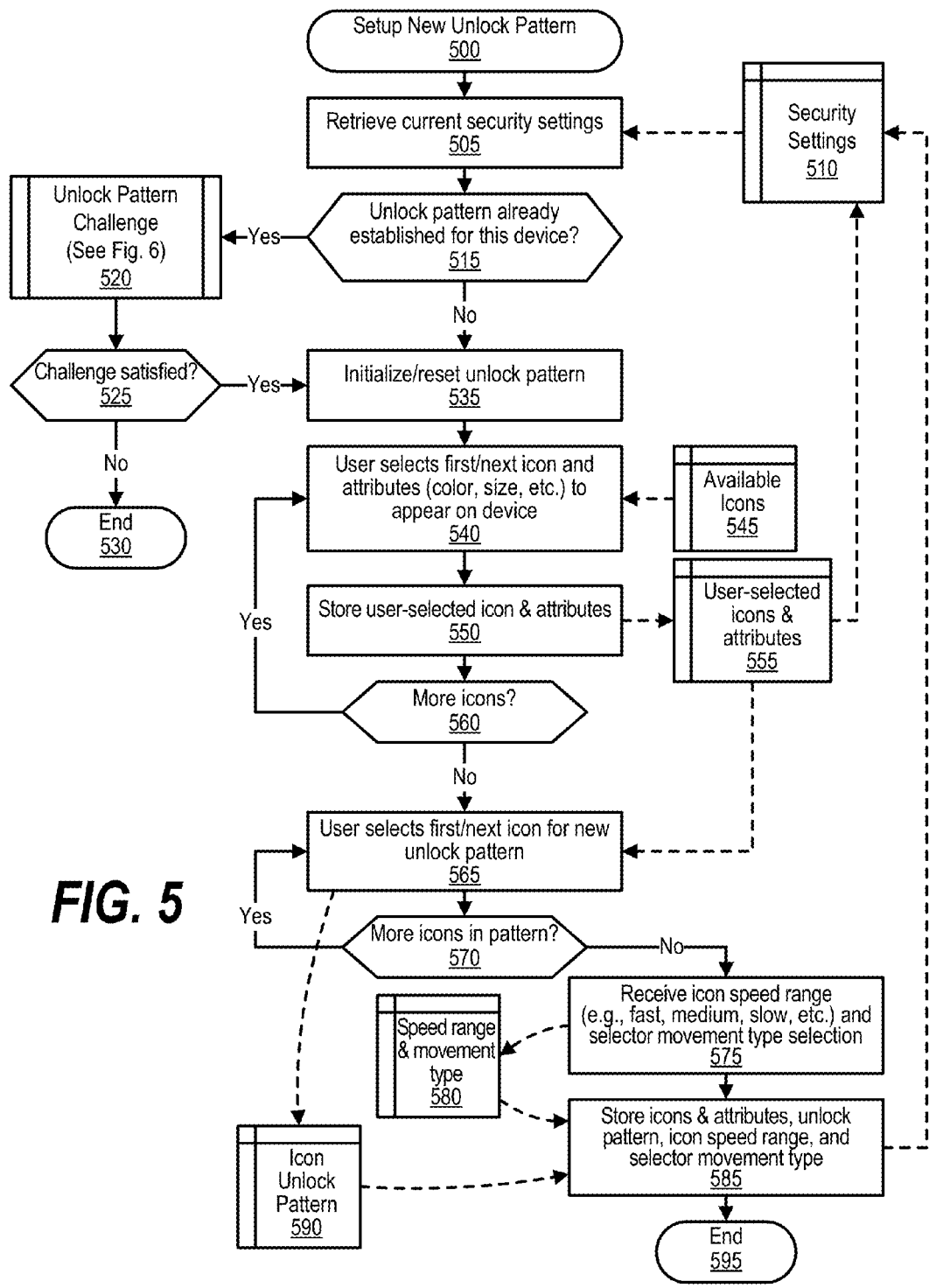
FIG. 5 is a flowchart showing steps taken during a setup process to secure a device with a changing unlock pattern of moving icons.

FIG. 5 is a flowchart showing steps taken during a setup process to secure a device with a changing unlock pattern of moving icons. Processing commences at 500, whereupon, at step 505, the process retrieves current security settings from security settings memory area 510. The process determines as to whether an unlock pattern has already been established for this device (decision 515).

If an unlock pattern has already been established for this device, then decision 515 branches to the 'yes' branch. On the other hand, if an unlock pattern has not already been established for this device, then decision 515 branches to the 'no' branch. Following the 'yes' branch, at predefined process 520, the process performs the Unlock Pattern Challenge routine (see FIG. 6 and corresponding text for processing details). The process determines as to whether the user successfully satisfied the unlock challenge (decision 525). If the user successfully satisfied the unlock challenge, then decision 525 branches to the 'yes' branch. On the other hand, if the user did not successfully satisfy the unlock challenge, then decision 525 branches to the 'no' branch and processing ends at 530 without changing the unlock pattern.

If no unlock pattern has been established (decision 515 branching to the 'no' branch) or the unlock challenge was satisfied (decision 525 branching to the 'yes' branch), then, at step 535, the process initializes or resets the unlock pattern used for this device. At step 540, the user selects the first graphic object and its attributes (color, size, etc.) to appear on device. The available icons are retrieved from memory area 545. At step 550, the process stores the user-selected graphic object and its attributes in memory area 555. The process determines as to whether the user wishes to select more graphic objects (decision 560). If more graphic objects are being selected, then decision 560 branches to the 'yes' branch which loops back to step 540 to receive the next graphic object selection from the user. This looping continues until no more graphic objects are being selected by the user, at which point decision 560 branches to 'no' branch for further processing.

At step 565, the user selects the first graphic object from memory area 555 to use for a new unlock pattern for the device. The selected graphic object is stored in memory area 590 as part of the new unlock pattern. The process determines as to whether more graphic objects are to be included in the unlock pattern (decision 570). If more graphic objects are to be included in the unlock pattern, then decision 570 branches to the 'yes' branch which loops back to receive the next graphic object selection from the user. This looping continues until all of the graphic objects to be included in the unlock pattern have been received, at which point decision 570 branches to the 'no' branch. At step 575, the process receives the graphic object speed range (e.g., fast, medium, slow, etc.) and the selector movement type selection (e.g., finger always pressing against surface of screen while making selections, finger can leave surface of screen between selections, etc.). Step 575 stores the speed range and movement type memory area 580. At step 585, the process stores the graphic objects and attributes, the unlock pattern, the graphic object speed range, and the selector movement type in security settings memory area 510. FIG. 5 processing thereafter ends at 595.

Figure 6:
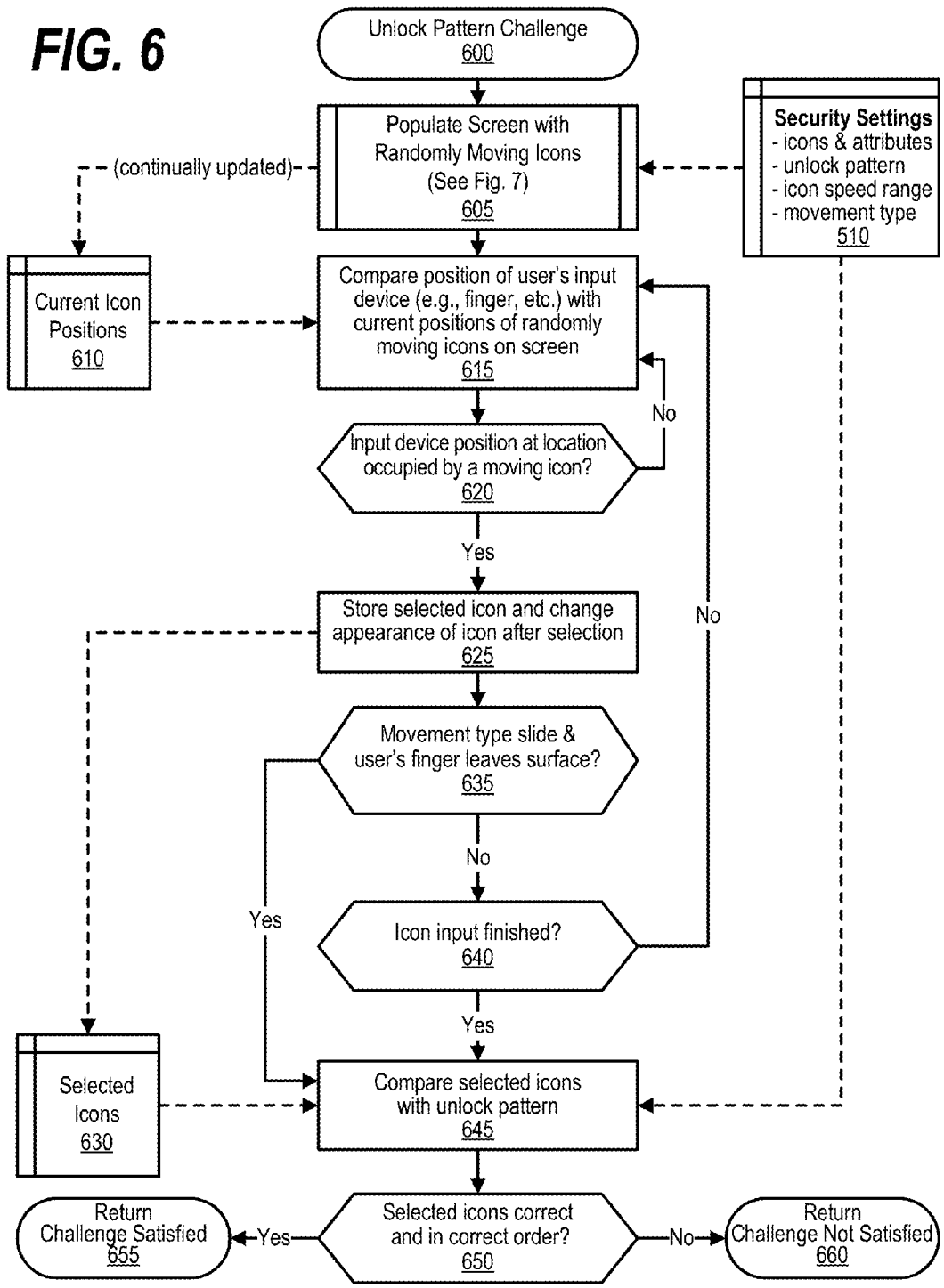
FIG. 6 is a flowchart showing steps taken to challenge a user of a secured device with a changing unlock pattern of moving icons.

FIG. 6 is a flowchart showing steps taken to challenge a user of a secured device with a changing unlock pattern of moving icons. Processing commences at 600 whereupon, at predefined process 605, the process performs the Populate Screen with Randomly Moving Icons routine (see FIG. 7 and corresponding text for processing details).

At step 615, the process compares the position of user's input device (e.g., finger, etc.) with the current positions of the randomly moving graphic objects appearing on the screen which are moving in a pseudo-random fashion. The process determines as to whether the input device's position is at a location occupied by a moving icon (decision 620). If the input device's position is not at a location occupied by a moving icon, then decision 620 branches to the 'no' branch which repeatedly loops back to step 615 until the input device's position is at a location occupied by a moving icon, at which point decision 620 branches to the 'yes' branch to process the selection.

At step 625, the process stores the graphic object selected by the user in memory area 630. In one embodiment, once selected by the user, the graphic object changes (e.g., a red triangle selected by the user changes into a pseudo-random shape, such as a green circle or a blue square, etc.). In another embodiment, the graphic object can appear to "explode" and disappear from the screen, or simply disappear from the screen after being selected by the user.

The process determines as to whether the movement type is a slide type and the user's finger has left the surface of the display (decision 635). If the movement type is a slide type and the user's finger has left the surface of the display, then decision 635 branches to the 'yes' branch signaling completion of graphic object selection by the user. On the other hand, if either the movement type is not a slide type or the user's finger has not left the surface of the display, then decision 635 branches to the 'no' branch.

The process determines as to whether selection of graphic objects is finished (decision 640). For example, a device may require selection of a certain number of objects (e.g., four, etc.) to unlock the device. If selection of graphic objects by the user is finished, then decision 640 branches to the 'yes' branch. On the other hand, if selection of graphic objects by the user is not finished, then decision 640 branches to the 'no' branch which loops back to step 615 to continue comparing the user's input device position with the current position of graphic objects that appear on the screen. In addition, the use of "dummy" graphic objects can be utilized so that the user can select one or more "dummy" objects in between selection of expected with the dummy objects being ignored and the selected graphic objects only including the set of expected graphic objects that are selected in the expected selection order. In this embodiment, if an expected graphic object is selected in the wrong order, then the user's entry of the pattern is deemed unsuccessful.

At step 645, the process compares the selected graphic objects and the selection order with the unlock pattern which includes an expected set of graphic objects selected in an expected selection order. The process determines as to whether the graphic objects selected by the user match the expected graphic objects and were selected in the expected selection order (decision 650). If the graphic objects selected by the user and the selection order match the expected graphic objects and the expected selection order, then decision 650 branches to the 'yes' branch whereupon, at return 655, processing returns to the calling routine (see FIGS. 4 and 5) with a return code indicating that the user successfully satisfied the unlock challenge. On the other hand, if either the graphic objects selected by the user or the selection order do not match the expected graphic objects and the expected selection order, then decision 650 branches to the 'no' branch whereupon, at return 660, processing returns to the calling routine (see FIGS. 4 and 5) with a return code indicating that the user did not successfully satisfy the unlock challenge.

Figure 7:
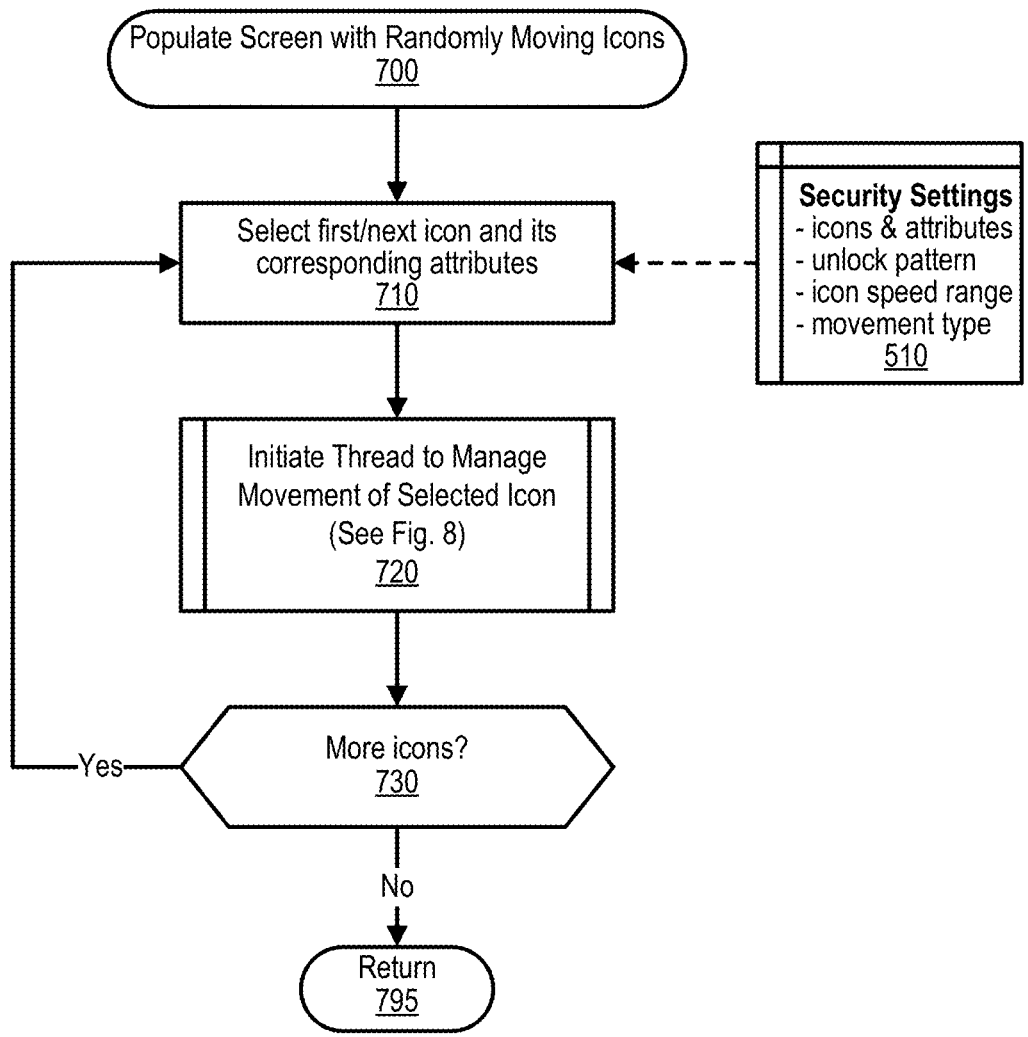
FIG. 7 is a flowchart showing steps taken to populate the screen of a device with a changing unlock pattern of moving icons.

FIG. 7 is a flowchart showing steps taken to populate the screen of a device with a changing unlock pattern of moving icons. Processing commences at 700 whereupon, step 710, the process selects the first graphic object and its corresponding attributes from memory area 510. At predefined process 720, the process performs the Initiate Thread to Manage Movement of Selected Icon routine (see FIG. 8 and corresponding text for processing details). Predefined process 720 initiates the thread that will manage the selected graphic object, including its pseudo-random movement on the display screen. The process determines as to whether there are more graphic objects to select (decision 730). If there are more graphic objects to select, then decision 730 branches to the 'yes' branch which loops back to step 710 to select the next graphic object from memory area 510 and initiate a thread to manage the graphic object. This looping continues until there are no more graphic objects to select, at which point decision 730 branches to the 'no' branch and processing returns to the calling routine (see FIG. 6) at 795.

Figure 8:
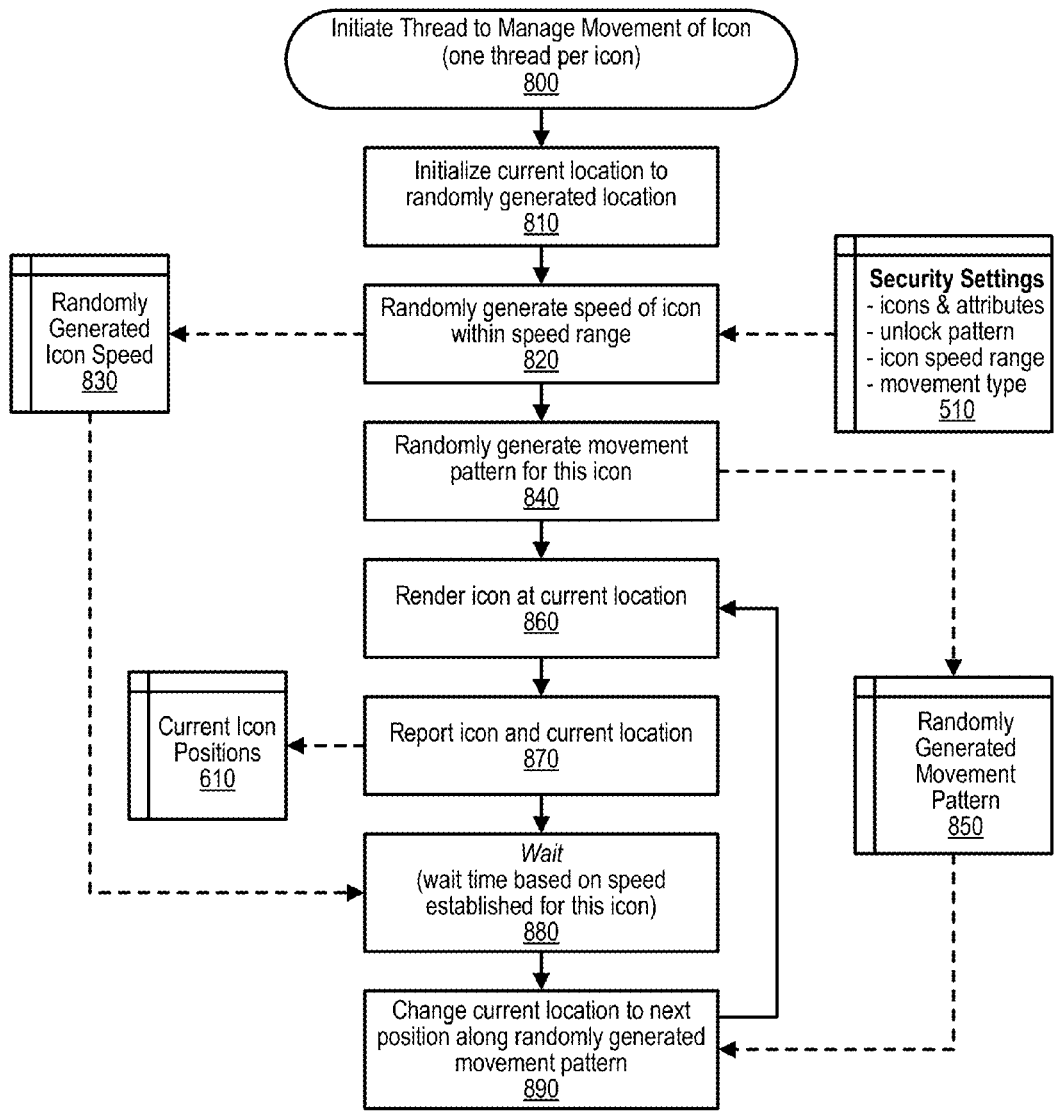
FIG. 8 is a flowchart showing steps taken to initiate threads that manage movement of the icons that appear on the screen.

FIG. 8 is a flowchart showing steps taken to initiate threads that manage movement of the icons that appear on the screen. Processing commences at 800 whereupon, at step 810 the process initializes the current location of this graphic object to a randomly generated location on the display screen. At step 820, the process randomly generates a speed of this graphic object within the speed range configured by the user during setup. The speed range is retrieved from memory area 510 and the randomly generated speed is stored in memory area 830.

At step 840, the process randomly generates a movement pattern for this graphic object. The randomly generated movement pattern is stored in memory area 850. In one embodiment, the movement patterns are randomly selected from a set of predefined movement patterns (e.g., "s" shaped, circular, "z" shaped, triangular, etc.). Other types of movement patterns that might be deployed include both random, Brownian type motion of the graphic objects as well as a streaming type of motion where the graphic objects appear from one side of the screen travel, across the screen, and disappear at the other side of the screen. At step 860, the process renders this graphic object at the current location. At step 870, the process reports this graphic object its current location to memory area 610 which includes the graphic objects and current positions of all graphic objects appearing on the screen.

At step 880, the process waits for a period of time at the current location with the wait time based on the randomly generated speed that was established for this graphic object that is retrieved from memory area 830. At step 890, after the wait period expires, the process changes the current location of this graphic object to the next position along the randomly generated movement pattern which is retrieved from memory area 850. Processing then loops back to step 860 to render the graphic object at its new current location and report the new current location to memory area 610. This looping continues until the pattern challenge is completed, at which point each of the threads initiated to manage the individual graphic objects are destroyed.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory coupled to at least one of the processors;
   a display screen accessible by at least one of the processors; and
   a set of instructions stored in the memory and executed by at least one of the processors to secure the information handling system, wherein the set of instructions perform actions of:
      displaying a plurality of moving graphic objects on the display screen of the information handling system;
      receiving, from a user, a selection of a set of the plurality of moving graphic objects in a selected order, wherein the selection is performed while the plurality of moving graphic objects are in motion; and
      unlocking the information handling system in response to the set of graphic objects selected by the user and the selection order matching an expected set of graphic objects and an expected selection order, wherein the unlocking allows the user to interact with one or more applications of the information handling system and to access data stored on the information handling system.

2. The information handling system of claim 1 further wherein the actions further comprise:
   configuring the plurality of moving graphic objects prior to performing the displaying, the receiving, and the unlocking, wherein the configuring further comprises:
      receiving an unlock pattern from the user, wherein the unlock pattern includes the expected set of graphic objects and the expected selection order; and
      storing the expected set of graphic objects and the expected selection order in the memory of the information handling system.

3. The information handling system of claim 2 wherein the configuring further comprises:
   selecting, by the user, the plurality of graphic objects that are displayed on the display screen.

4. The information handling system of claim 1 wherein each of the plurality of graphic objects move in a pseudo-random direction on the display screen.

5. The information handling system of claim 1 wherein the selection received by the user is a constant swipe motion where a finger of the user touches each of the moving graphic objects included in the selected set in the selection order without leaving a surface of the display screen.

6. The information handling system of claim 1 further wherein the actions further comprise:
   populating the display screen with the plurality of moving graphic objects that continue to move while the selection is being received from the user;
   repeatedly comparing a screen position of an input device touching a surface of the screen with a current position of each of the moving graphic objects; and
   detecting the selection of the set of the plurality of moving graphic objects based on the comparing until a determination is made that the selection being received from the user is complete.

7. The information handling system of claim 1 wherein each of the displayed moving graphic objects continues to move across the display screen while the selection is being received from the user, and wherein the actions further comprise:
   after selection of each of the moving graphic objects included in the set, changing an appearance of the selected moving graphic objects, wherein the changing is selected from the group consisting of altering the appearance and removing the selected moving graphic objects from the display screen.

8. A computer program product stored in a computer readable storage medium, comprising computer instructions that, when executed by an information handling system, causes the information handling system to secure the information handling system by performing actions comprising:
   displaying a plurality of moving graphic objects on the display screen of the information handling system;
   receiving, from a user, a selection of a set of the plurality of moving graphic objects in a selected order, wherein the selection is performed while the plurality of moving graphic objects are in motion; and
   unlocking the information handling system in response to the set of graphic objects selected by the user and the selection order matching an expected set of graphic objects and an expected selection order, wherein the unlocking allows the user to interact with one or more applications of the information handling system and to access data stored on the information handling system.

9. The computer program product of claim 8 further comprising:
   configuring the plurality of moving graphic objects prior to performing the displaying, the receiving, and the unlocking, wherein the configuring further comprises:
      receiving an unlock pattern from the user, wherein the unlock pattern includes the expected set of graphic objects and the expected selection order; and
      storing the expected set of graphic objects and the expected selection order in the memory of the information handling system.

10. The computer program product of claim 9 wherein the configuring further comprises:
    selecting, by the user, the plurality of graphic objects that are displayed on the display screen.

11. The computer program product of claim 8 wherein each of the plurality of graphic objects move in a pseudo-random direction on the display screen.

12. The computer program product of claim 8 wherein the selection received by the user is a constant swipe motion where a finger of the user touches each of the moving graphic objects included in the selected set in the selection order without leaving a surface of the display screen.

13. The computer program product of claim 8 wherein each of the displayed moving graphic objects continues to move across the display screen while the selection is being received from the user and wherein the actions further comprise:
    populating the display screen with the plurality of moving graphic objects that continue to move while the selection is being received from the user;

repeatedly comparing a screen position of an input device touching a surface of the screen with a current position of each of the moving graphic objects; and detecting the selection of the set of the plurality of moving graphic objects based on the comparing until a determination is made that the selection being received from the user is complete.

\* \* \* \* \*